J. F. MERKEL.
MOTOR WHEEL.
APPLICATION FILED SEPT. 28, 1916.

1,297,218.

Patented Mar. 11, 1919.
5 SHEETS—SHEET 3.

Inventor
Joseph F. Merkel
By his Attorney
Archibald Cox

J. F. MERKEL.
MOTOR WHEEL.
APPLICATION FILED SEPT. 28, 1916.

1,297,218.

Patented Mar. 11, 1919.
5 SHEETS—SHEET 4.

Inventor
Joseph F. Merkel
By his Attorney
Archibald Cox

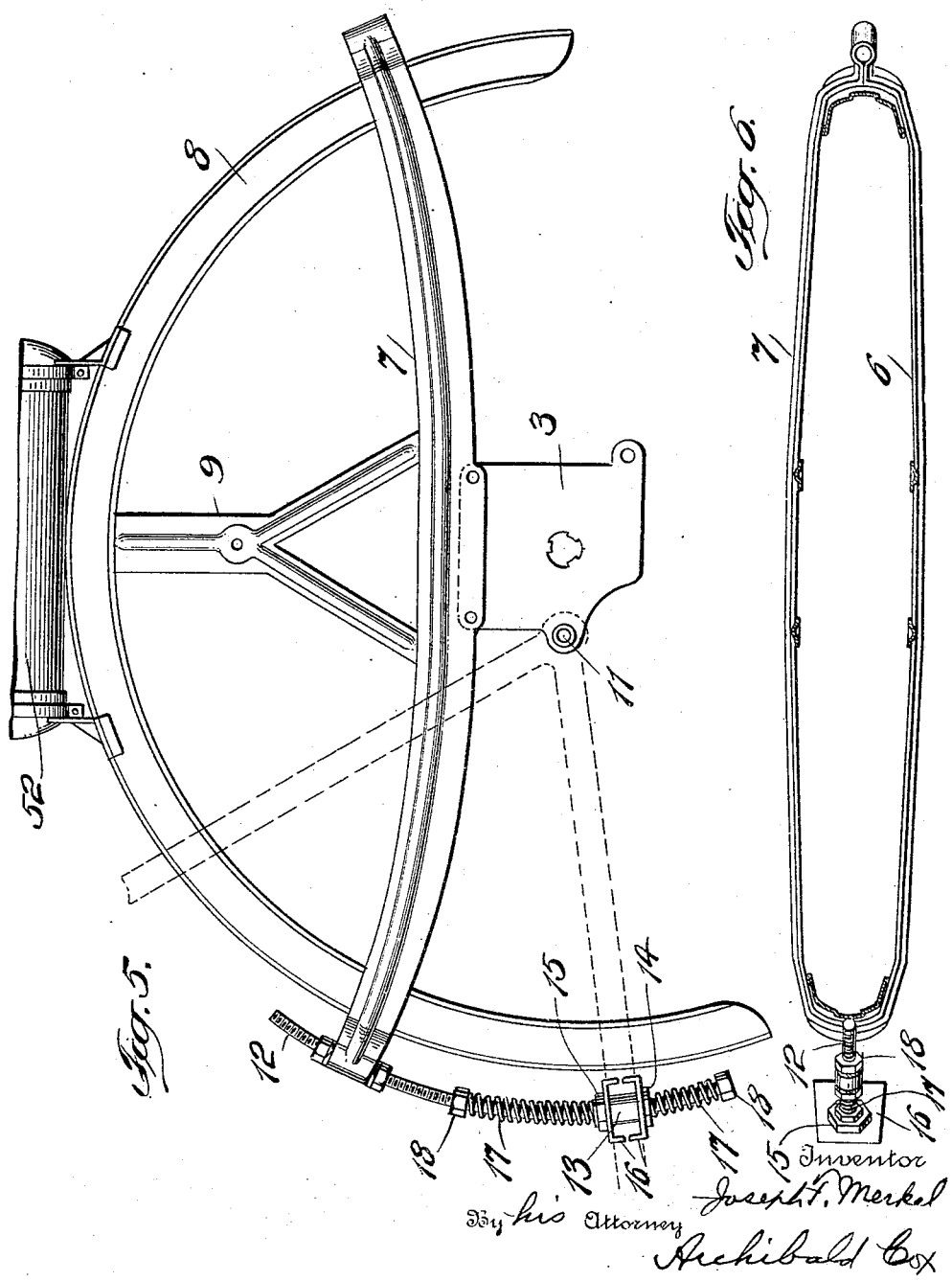

UNITED STATES PATENT OFFICE.

JOSEPH F. MERKEL, OF FLUSHING, NEW YORK.

MOTOR-WHEEL.

1,297,218.   Specification of Letters Patent.   Patented Mar. 11, 1919.

Application filed September 28, 1916. Serial No. 122,607.

*To all whom it may concern:*

Be it known that I, JOSEPH F. MERKEL, a citizen of the United States, and a resident of Flushing, in the county of Queens and State of New York, have invented certain new and useful Improvements in Motor-Wheels, of which the following is a specification.

The invention relates to motor-wheels of the class in which the cylinder and crank-case of the engine which drive the wheel are mounted without the road-wheel which is driven. The object of my invention is to provide a motor-wheel which may be readily attached to an ordinary bicycle in place of one of its wheels. An additional object of my invention is to provide the bicycle to which it is attached with what is in effect a spring frame.

My motor-wheel consists of a framework comprising the engine crank-case on one side, an end-plate on the other side and a rigid sleeve extending between the crank-case and the end-plate. Upon the outside of this sleeve and between the crank-case and the end-plate is mounted the road-wheel, and within the sleeve is the crank-shaft of the engine. The frame is pivoted to the rear forks of the bicycle at a point forward of the axis of the road-wheel. The motion of the frame of the motor-wheel upon this pivot is limited by frame sides, which are attached to the frame and extend substantially horizontally surrounding the road-wheel. The frame sides are elastically connected at their inner end to the frame of the bicycle.

Having stated the general nature of the device embodying my invention, I will describe it in detail with the aid of the accompanying drawings, in which—

Fig. 5 is a detailed side elevation showing the frame sides, the end-plate and parts connected therewith; and Fig. 6 is a top view of the frame sides.

Figure 1:
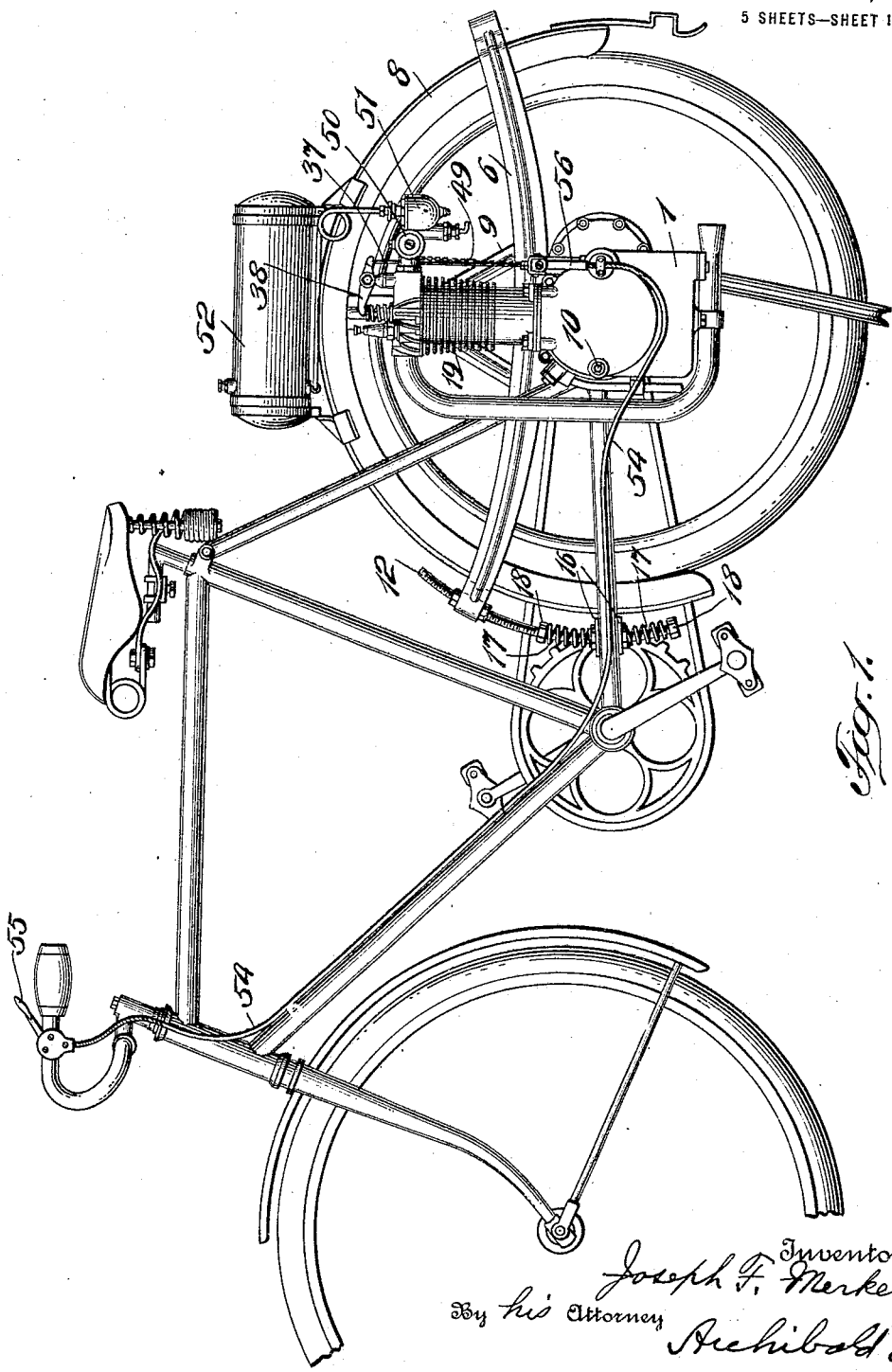
Figure 1 is a side view of a bicycle with my motor-wheel attached.
Figure 2:
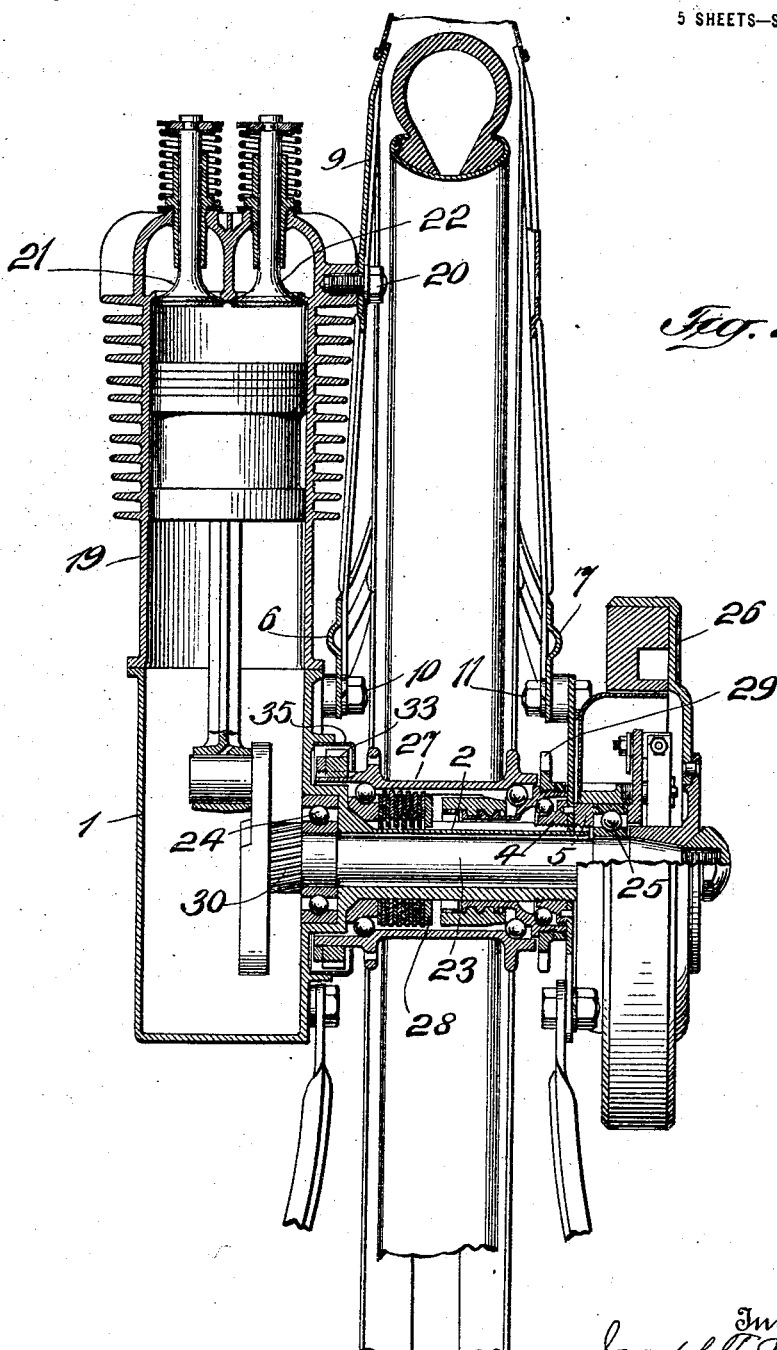
Fig. 2 is a vertical section of the motor-wheel taken through the axis of the road-wheel and the crank-shaft.
Figure 3:
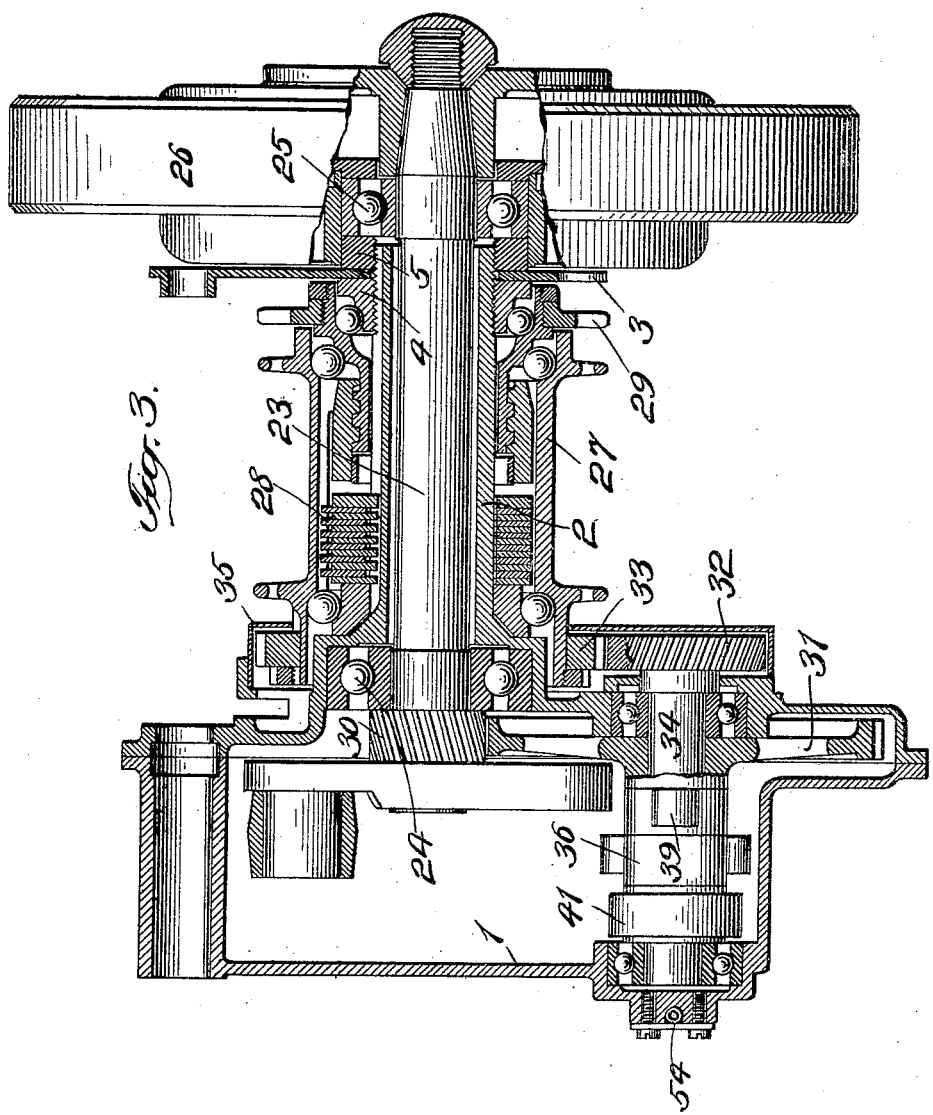
Fig. 3 is a horizontal section taken through the axis of the road-wheel and crank-shaft, and showing only those portions of the crank-case and frame which intersect the section plane.

I will first describe the framework of my motor-wheel. The crank-case 1 has a rigid projecting sleeve 2, which is preferably integral with the crank-case 1, as shown in the drawings. To the outer end of this sleeve is attached the end-plate 3, which is splined upon the sleeve 2, and rigidly held by the nuts 4 and 5. To the upper inner portion of the crank-case 1 and end-plate 3 are bolted the frame sides 6, 7. The frame sides 6, 7 come together at their forward and rear ends (Fig. 6), and to them is attached the mud-guard 8 and the braces 9, 9, which extend upwardly from the frame sides to the mud-guard. The parts thus described form together a rigid motor-wheel frame.

The motor-wheel frame is pivotally connected with the bicycle frame by means of the bolt 10, passing through one of the rear forks and through an aperture near the forward end of the crank-case, and the bolt 11 passing through the other of the rear forks and through an aperture near the forward end of the end-plate. A curved bolt 12 is adjustably attached to the forward end of the frame sides 6, 7 by means of nuts, and extends down between the lower rear forks of the bicycle. Upon the bolt 12 is a short sleeve 13, having a head 14 at one end and a nut 15 screwed upon its other end. Between the head and the nut are the guide-plates 16, which are clamped upon the lower forks of the bicycle by setting up the nut 15. The sleeve 13 is loose upon the bolt 12 and is resiliently held in place by the springs 17, which re-act against nuts 18 screwed upon the bolt 12. As will be readily seen, this arrangement of springs and the pivoting of the motor-wheel frame to the bicycle frame at a point forward of the axis of the rear wheel produces a vehicle with a spring frame.

The mechanism of the motor-wheel will next be described. The engine cylinder 19 is attached to the upper portion of the crank-case 1 and is also bolted to one of the braces 9 by means of the bolt 20. The engine is an ordinary four-cycle gasolene engine having an intake valve 21 and an exhaust valve 22 at the top of the cylinder. The crank-shaft 23 of the engine extends through the sleeve 2 and is mounted upon ball-bearings 24 and 25, whose outer races are carried by the sleeve 2. The crank-shaft 23 extends beyond the outer end of the sleeve 2, and upon the protruding portion of the crank-shaft is mounted the fly-wheel 26, which may contain a fly-wheel magneto of a type well understood in the art. The hub 27 of the road-wheel is mounted upon the outer surface of the sleeve 2. Within this hub and outside of the sleeve 2, I preferably insert an ordinary coaster brake 28. This makes it possible to drive the road-wheel by means of the chain sprocket 29, and to let it turn without turning the sprocket.

The transmission consists of the pinions 30, 31, 32 and 33. The pinion 30 is mounted upon the crank-shaft 23 within the crank-case 1. The pinion 31 is mounted upon the counter-shaft 34, which is journaled within the crank-case 1 at one side of the crank-shaft. The pinion 31 is four times as great in diameter as the pinion 30. The counter-shaft 34 extends out through the inner side of the crank-case 1, and upon its outer end is mounted the pinion 32, which meshes with the pinion 33, mounted upon the hub 27 of the road-wheel. A casing 35 may be provided to keep the dust out of the last-mentioned pinions.

The engine valves are operated by means of cams upon the counter-shaft 34. The cam 36 lifts the rod 37 operating the lever 38, which controls the intake valve 21. The cam 39 raises the rod 40, which operates a lever actuating the exhaust valve 22. The eccentric 41 upon the counter-shaft 34 operates the oil circulation pump 42.

It it not necessary that the ratio between the pinions 30 and 31 be one to four as described, but it must be an even ratio, in order that the cams upon the counter-shaft 34 may properly operate the valves of the engine. If the ratio is one to two, only one raised portion upon each cam will be used. If the ratio is one to four, it is necessary to have two raised portions opposite each other, as illustrated. If the ratio is one to six, three raised portions will be used upon each cam, etc. It is important that the ratio between the pinions 32 and 33 be an uneven ratio. Otherwise there would be an even gear ratio between the crank-shaft of the engine and the road-wheel, so that the power impulses would be evenly distributed during each rotation of the road-wheel. This is objectionable because of the wear it produces upon the tire of the road-wheel. Thus for example, if an even gear ratio were used, which resulted in just four power impulses for each rotation of the road-wheel, it is obvious that there would be just four points on the tire of the wheel which would be in contact with the ground at the time of the power impulses. The wear at these four points would be excessive. Similarly, if an even ratio were used, so that there were three power impulses during each rotation of the road-wheel, three points of the tire would receive excessive wear. If, however, the gear ratio is an uneven multiple or fraction, so that, for example, explosions occur during each seven twenty-fourths of the rotation of the ground-wheel, it is obvious that a different portion of the tire is on the ground at each explosion, so that the wear is even.

I make use of the splash oiling system, maintaining the oil at a constant level in the crank-case 1 by pumping it into the crank-case from the chamber 43 by means of the oil pump 42.

Figure 4:
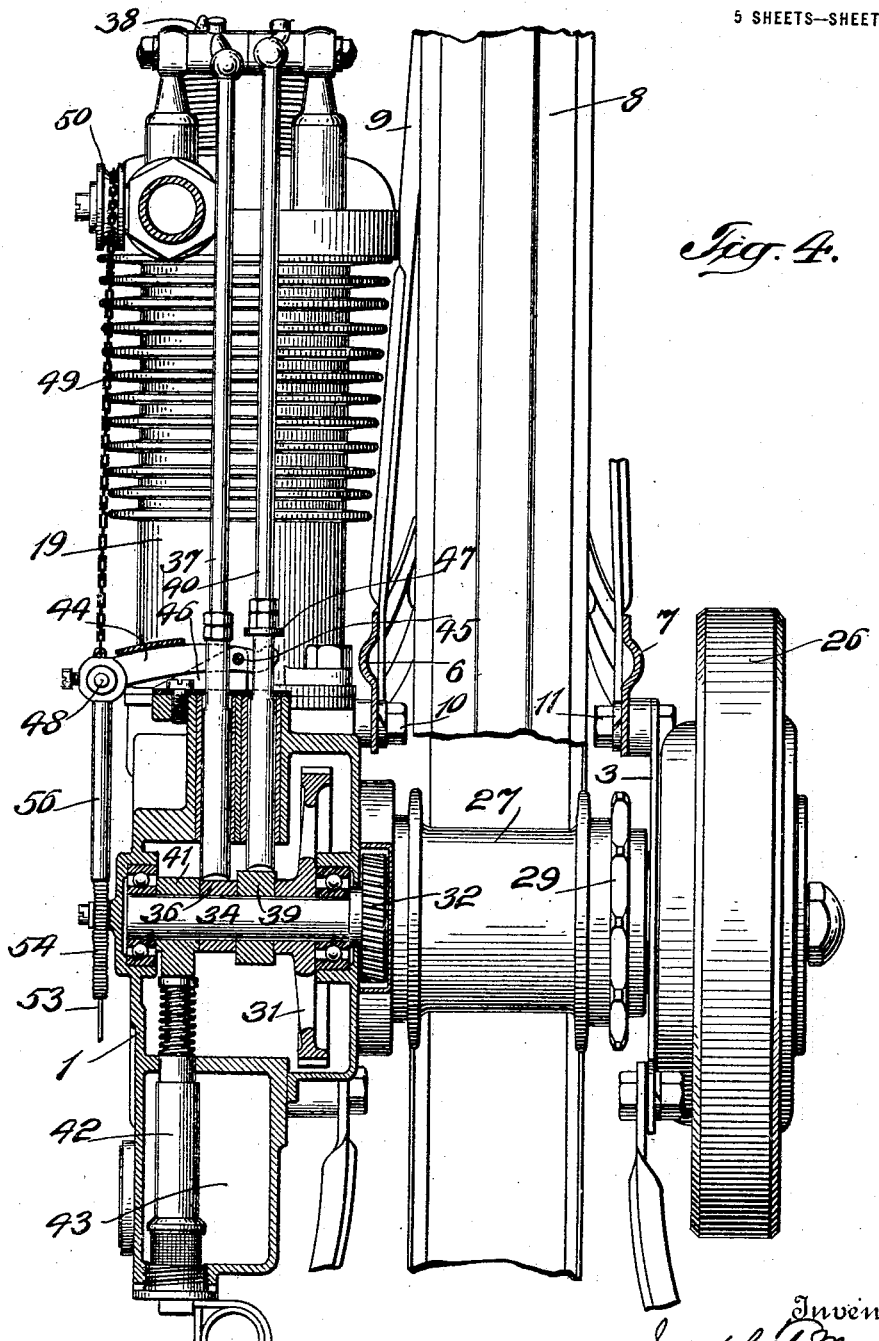
Fig. 4 is a vertical elevation taken through the axis of the countershaft.

The control for the engine of my motor-wheel is shown in Figs. 1 and 4. A lever 44 is pivoted at 45 to a bracket 46 screwed upon the crank-case 1. The right-hand end of this lever, Fig. 4, abuts against a shoulder 47 on the exhaust valve rod 40. At the left-hand end of the lever 44 is a pin 48, to which is attached a chain 49 leading upwardly to a pulley 50 operating the throttle valve between the intake valve 21 and the carbureter 51, which receives fuel from a tank 52, mounted upon the mud-guard 8. A wire 53 is also attached to the pin 48 and passes downward through a flexible sheath 54 around the crank-case 1 and then along the bicycle frame to a controlling lever 55 upon the handle-bar. A loosely fitting sleeve 56 is pivoted to the pin 48 and depends therefrom to cover and protect the upper end of the sheath 54. In the arrangement shown, the movement of the control lever upon the handle-bar in one direction results in lifting the exhaust valve and thus relieving the compression, so that the bicycle may be pedaled, and a movement in the other direction releases the exhaust valve and gradually opens the throttle.

While one great advantage of my motor-wheel is the fact that it may be attached to any bicycle, it is nevertheless true that many features of my invention may be advantageously applied to motor vehicles in which the driving wheel is not detachable. By use of the expression "motor-wheel" in the succeeding claims, therefore, I wish to be understood to include motor driven wheels permanently attached to motor vehicles, as well as detachable motor-wheels.

I claim:—

1. A motor-wheel for bicycles comprising a rigid frame pivotally attached to the rear forks of the bicycle, resilient means for limiting the pivotal motion of said frame about the rear forks, a road-wheel partly between the rear forks of the bicycle and rotatably mounted upon said frame at a point rearward of the point at which the frame is pivoted to the forks, and a motor carried by said frame and driving said road-wheel.

2. An attachment for bicycles comprising a frame pivotally attached to the forks of the bicycle, resilient means limiting the pivotal motion of said frame with relation to said forks, and a road-wheel mounted upon said frame at a point spaced apart from the point at which said frame is pivoted to said forks.

3. An attachment for bicycles comprising a frame pivotally attached to the forks of the bicycle, a road-wheel mounted upon said frame at a point spaced apart from the point at which said frame is pivoted to said forks, frame sides rigidly secured to said frame, and resilient means connecting said frame sides to the frame of the bicycle.

4. An attachment for bicycles comprising a frame pivotally attached to the rear forks of the bicycle, a road-wheel partly within said forks rotatably mounted upon said frame at a point spaced apart from the point at which said frame is pivoted to said forks, frame sides rigidly connected to said frame and surrounding said road-wheel, and resilient means connecting said side frame with the frame of the bicycle.

5. An attachment for bicycles comprising a frame pivotally attached to the rear forks of the bicycle, a road-wheel partly within said forks rotatably mounted upon said frame at a point spaced apart from the point at which said frame is pivoted to said forks, frame sides rigidly attached to said frame, surrounding said road-wheel and lying within said forks, and resilient means connecting said frame sides with the frame of the bicycle.

6. An attachment for bicycles comprising two members each pivotally attached at the outside of the forks of the bicycle and connected by an axle spaced apart from the points at which said members are pivoted to said forks, a road-wheel mounted upon said axle and partly between said forks, and resilient means for limiting the pivotal motion of said members in relation to said forks.

7. In a motor-wheel the combination of an engine having a cylinder, a crank-case, a non-rotating sleeve extending from said crank-case, a road-wheel mounted upon said sleeve, and transmission mechanism connecting said engine with said road-wheel.

8. A motor-wheel comprising an engine having a cylinder, a crank-case and a crank-shaft, a non-rotating sleeve extending from said crank-case and surrounding a portion of said crank-shaft, a road-wheel mounted upon said sleeve, and transmission mechanism connecting said crank-shaft to said rotary member.

9. In a motor vehicle, a frame, a fixed sleeve, a road-wheel mounted upon said sleeve, means connecting each end of said sleeve to the frame, an engine having a crank-shaft extending through said sleeve, and transmission mechanism connecting said crank-shaft with said road-wheel.

10. A motor-wheel comprising an engine having a cylinder, a crank-case adapted to be connected to the forks of the bicycle, a crank-shaft projecting from said crank-case, a fixed sleeve projecting from said crank-case and surrounding said crank-shaft for a portion of its length, an end-plate rigidly connected to the outer end of said sleeve and adapted to be connected to the forks of the bicycle, and a road-wheel mounted upon said sleeve.

11. In a motor-wheel, the combination of an engine crank-case having an integral projecting sleeve, a crank-shaft within said sleeve, a road-wheel mounted upon said sleeve, and transmission mechanism connecting said crank-shaft with said road-wheel.

12. In a motor-wheel, an engine having a casing, an engine-shaft extending through said casing, a non-rotating sleeve extending from said casing and surrounding a portion of said engine-shaft, a road-wheel rotatably mounted upon said sleeve, a pinion connected to said road-wheel, mechanism connecting said driving pinion with said road-wheel, including a pinion upon said engine-shaft within said casing, a counter-shaft extending through said engine-casing and bearing a pinion within said casing meshing with said pinion upon said engine-shaft, and a pinion without said casing meshing with said pinion connected to said road-wheel.

13. In a motor-wheel, a road-wheel, a pinion on said road-wheel, an engine having a crank-shaft, a pinion upon said crank-shaft, a driving connection between said pinion and the pinion upon said road-wheel, including an intermediate pinion rotated at an even fraction of the speed of the crank-shaft, and valve mechanism for said engine operated from the last mentioned pinion.

14. In a motor-wheel, an internal combustion engine having a crank-shaft and having valves, a counter-shaft driven by said crank-shaft at an even fraction of the speed of said crank-shaft, a road-wheel driven by said counter-shaft, and valve operating mechanism actuated by said counter-shaft.

15. In a motor-wheel, an internal combustion engine having valves and a crank-shaft, a counter-shaft driven by said crank-shaft at an even fraction of the speed of said crank-shaft, a road-wheel driven by said counter-shaft, cams upon said counter-shaft, and valve operating mechanism for said engine actuated by said cams.

16. In a motor-wheel, an internal combustion engine having valves and a crank-shaft, a counter-shaft driven by said crank-shaft, a road-wheel driven by said counter-shaft at an uneven multiple or fraction of the speed of said counter-shaft, and valve operating mechanism operated by said counter-shaft.

17. In a motor-wheel, an internal combustion engine having valves and a crank-shaft, a pinion upon said crank-shaft, a road-wheel, a pinion upon said road-wheel, a counter-shaft having a pinion meshing with said crank-shaft pinion and having an even gear ratio with said pinion, and a pinion meshing with said road-wheel pinion and having an uneven gear ratio with said pinion.

18. In a motor vehicle, a frame having two forks, a non-rotating sleeve attached to both of said forks, a road-wheel mounted upon said sleeve, an engine-shaft within said sleeve, and transmission mechanism connecting said engine shaft with said road-wheel.

JOSEPH F. MERKEL.

Copies of this patent may be obtained for five cents each, by addressing the "Commissioner of Patents, Washington, D. C."